(12) United States Patent
Aramaki et al.

(10) Patent No.: US 12,537,175 B2
(45) Date of Patent: Jan. 27, 2026

(54) SEMICONDUCTOR DEVICE MANUFACTURING SYSTEM AND SEMICONDUCTOR DEVICE MANUFACTURING METHOD

(71) Applicant: Hitachi High-Tech Corporation, Tokyo (JP)

(72) Inventors: Toru Aramaki, Tokyo (JP); Go Saito, Tokyo (JP); Kenichiro Komeda, Tokyo (JP); Yuji Enomoto, Tokyo (JP); Takashi Tsutsumi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 17/435,523

(22) PCT Filed: May 13, 2021

(86) PCT No.: PCT/JP2021/018152
§ 371 (c)(1),
(2) Date: Sep. 1, 2021

(87) PCT Pub. No.: WO2021/241242
PCT Pub. Date: Dec. 2, 2021

(65) Prior Publication Data
US 2023/0072665 A1    Mar. 9, 2023

(30) Foreign Application Priority Data

May 25, 2020    (WO) .................. PCT/JP2020/020456

(51) Int. Cl.
*H01J 37/32*    (2006.01)
*G06N 20/00*    (2019.01)
(Continued)

(52) U.S. Cl.
CPC .. *H01J 37/32862* (2013.01); *H01J 37/32926* (2013.01); *H01J 37/3299* (2013.01);
(Continued)

(58) Field of Classification Search
USPC .......................... 700/121, 91, 108, 109, 110
See application file for complete search history.

(56) References Cited

U.S. PATENT DOCUMENTS

2003/0024810 A1*   2/2003   Smith, Jr. ................. G01J 3/28
                                                                        204/298.03
2004/0149208 A1*   8/2004   Shiraishi ........... H01L 21/67253
                                                                        118/715
(Continued)

FOREIGN PATENT DOCUMENTS

EP          3819930 A1    5/2021
JP        2002016123 A    1/2002
(Continued)

OTHER PUBLICATIONS

Anwar, "Machine Learning—Classification" Nov. 2, 2019, accessed at: https://machinelearningmind.com/2019/11/02/machine-learning-classification/ (5 pg. Print out provided) (Year: 2019).*
(Continued)

*Primary Examiner* — Emilio J Saavedra
(74) *Attorney, Agent, or Firm* — Miles & Stockbridge, P.C.

(57) ABSTRACT

The invention is to provide a semiconductor manufacturing apparatus system and a semiconductor device manufacturing method for reducing particles having an adverse effect in a manufacturing step of a semiconductor device. A semiconductor device manufacturing system, includes: a semiconductor manufacturing apparatus; and a platform connected to the semiconductor manufacturing apparatus via a network and in which a particle reduction processing is
(Continued)

executed, in which the particle reduction processing includes: a step of acquiring a particle characteristic value by using a sample processed by the semiconductor manufacturing apparatus; a step of specifying a component of the semiconductor manufacturing apparatus leading to a particle generation based on the acquired particle characteristic value and correlation data by machine learning; a step of defining a cleaning condition for cleaning the semiconductor manufacturing apparatus based on the specified component; and a step of cleaning the semiconductor manufacturing apparatus using the defined cleaning condition, and the correlation data is correlation data between the particle characteristic value acquired in advance and the component.

14 Claims, 5 Drawing Sheets

(51) Int. Cl.
H01L 21/3065 (2006.01)
H01L 21/67 (2006.01)

(52) U.S. Cl.
CPC .......... *G06N 20/00* (2019.01); *H01J 37/3288* (2013.01); *H01J 2237/334* (2013.01); *H01J 2237/335* (2013.01); *H01L 21/3065* (2013.01); *H01L 21/67288* (2013.01)

(56) References Cited

U.S. PATENT DOCUMENTS

| | | | |
|---|---|---|---|
| 2006/0160256 A1 | 7/2006 | Obi et al. | |
| 2012/0029863 A1* | 2/2012 | Miyauchi | G06V 10/758 |
| | | | 702/128 |
| 2016/0189931 A1 | 6/2016 | Nozawa | |
| 2017/0040177 A1 | 2/2017 | Sasaki et al. | |
| 2018/0267512 A1 | 9/2018 | Yamamoto | |
| 2019/0218663 A1 | 7/2019 | Funakubo et al. | |
| 2019/0324373 A1* | 10/2019 | Kamimura | G01N 30/7233 |
| 2020/0125044 A1* | 4/2020 | Ide | G06N 20/00 |
| 2020/0164412 A1* | 5/2020 | Oh | B08B 9/053 |
| 2020/0226742 A1* | 7/2020 | Sawlani | H01L 21/67288 |
| 2021/0366749 A1* | 11/2021 | Rhee | G06Q 50/04 |
| 2022/0374572 A1* | 11/2022 | Sawlani | G06N 20/00 |

FOREIGN PATENT DOCUMENTS

| | | |
|---|---|---|
| JP | 2004241499 A | 8/2004 |
| JP | 2006086325 A | 3/2006 |
| JP | 2006202912 A | 8/2006 |
| JP | 2008034877 A | 2/2008 |
| JP | 2016122772 A | 7/2016 |
| JP | 2018156994 A | 10/2018 |
| JP | 2019125686 A | 7/2019 |
| JP | 6696059 B1 | 5/2020 |
| WO | 2015178348 A1 | 11/2015 |

OTHER PUBLICATIONS

Search Report mailed Jul. 13, 2021 in International Application No. PCT/JP2021/018152.

Written Opinion mailed Jul. 13, 2021 in International Application No. PCT/JP2021/018152.

Office Action mailed Jun. 25, 2024 in Chinese Application No. 202180002514.9.

* cited by examiner

[FIG. 1]
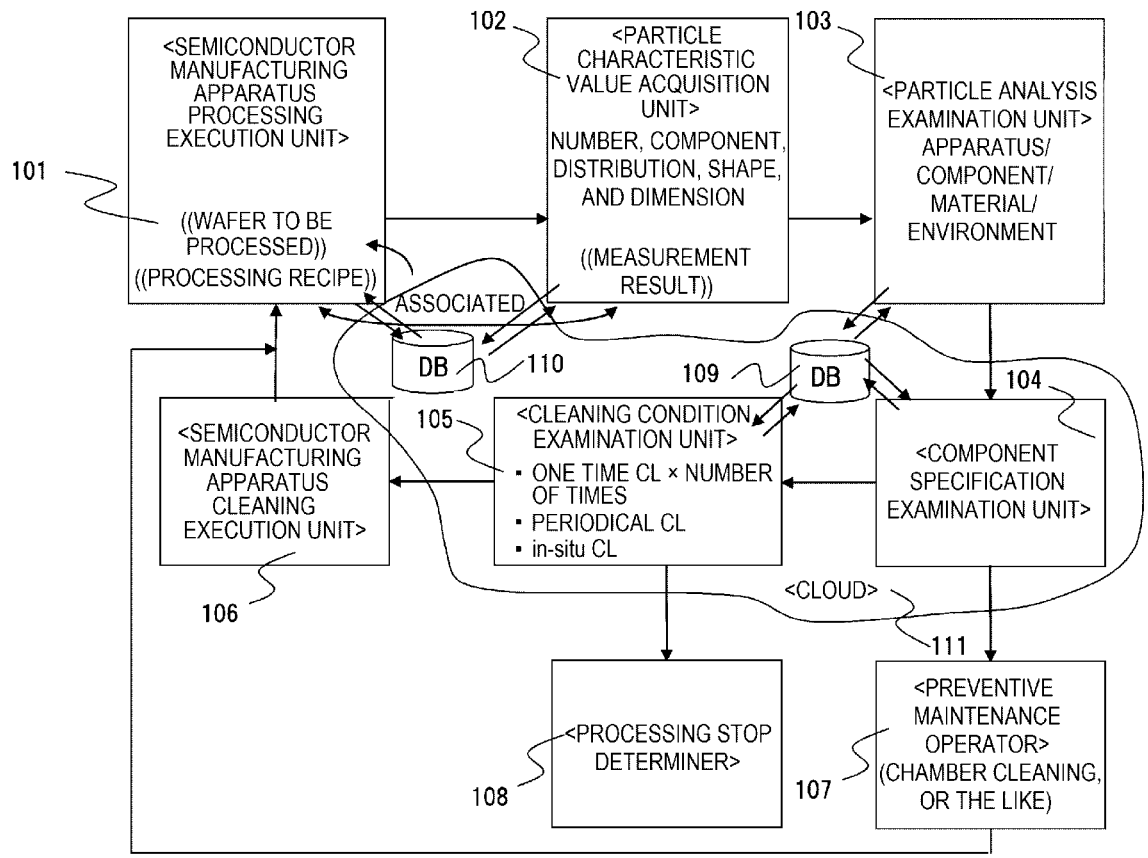

[FIG. 2]
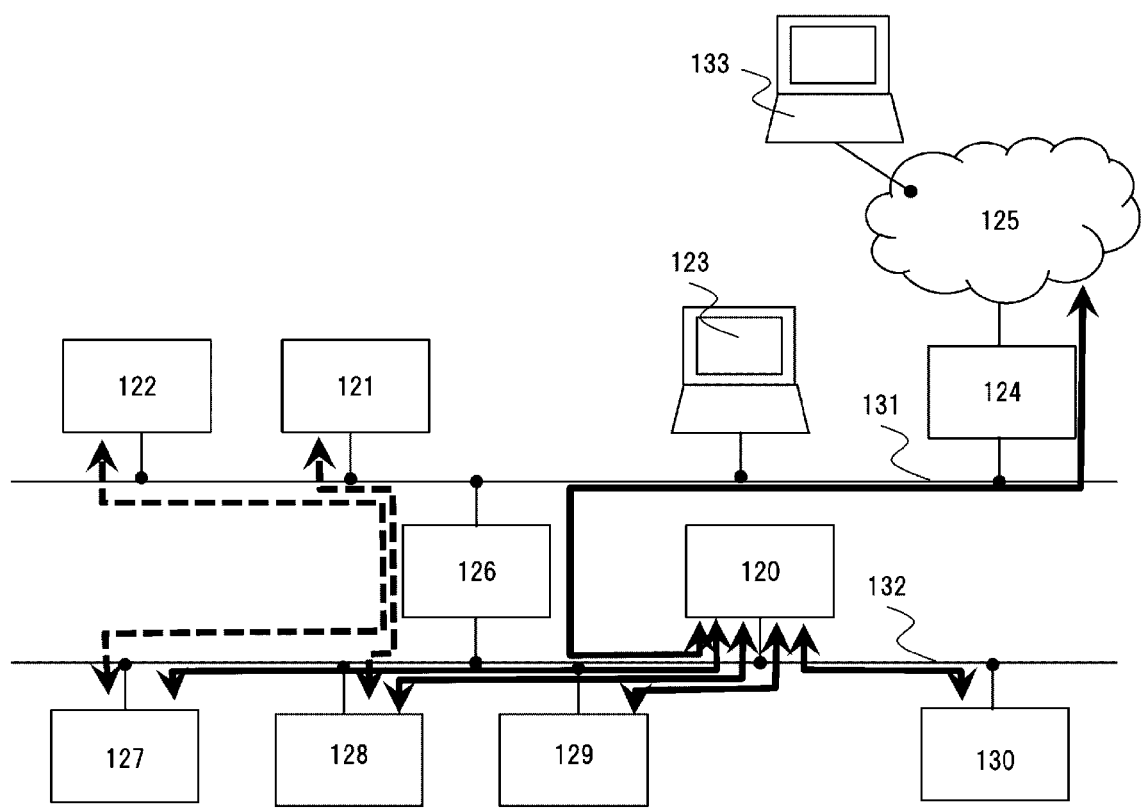

[FIG. 3]
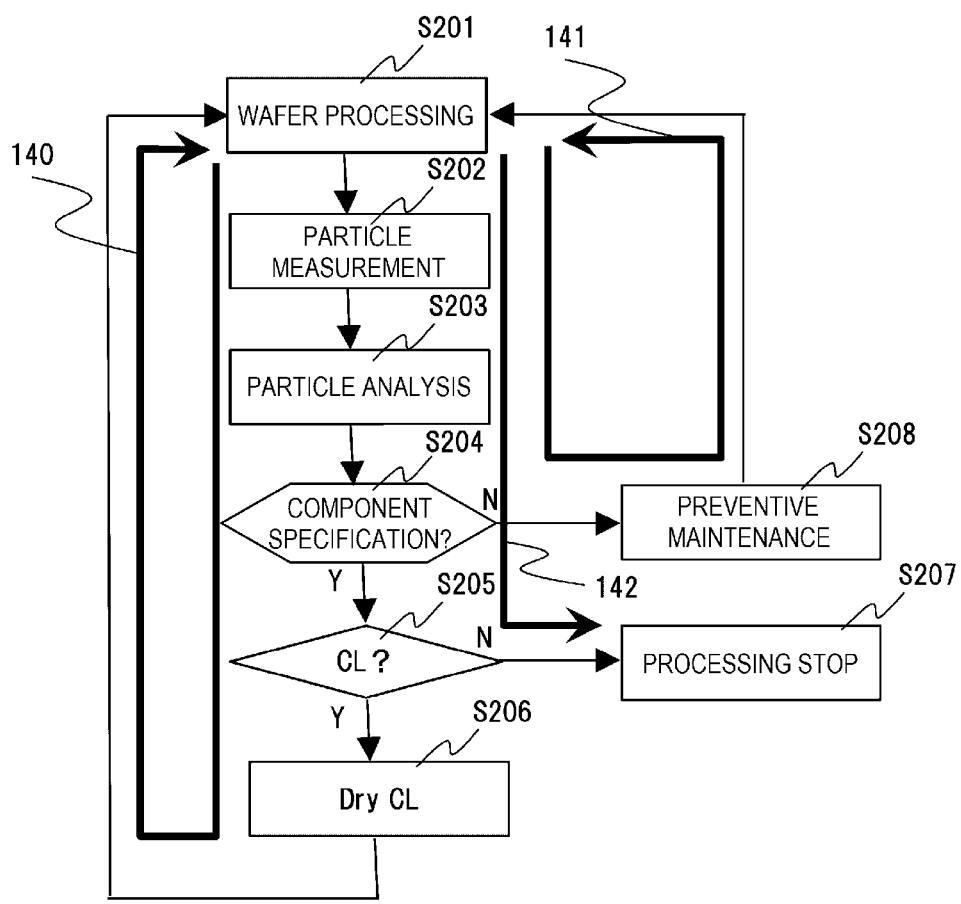

[FIG. 4]
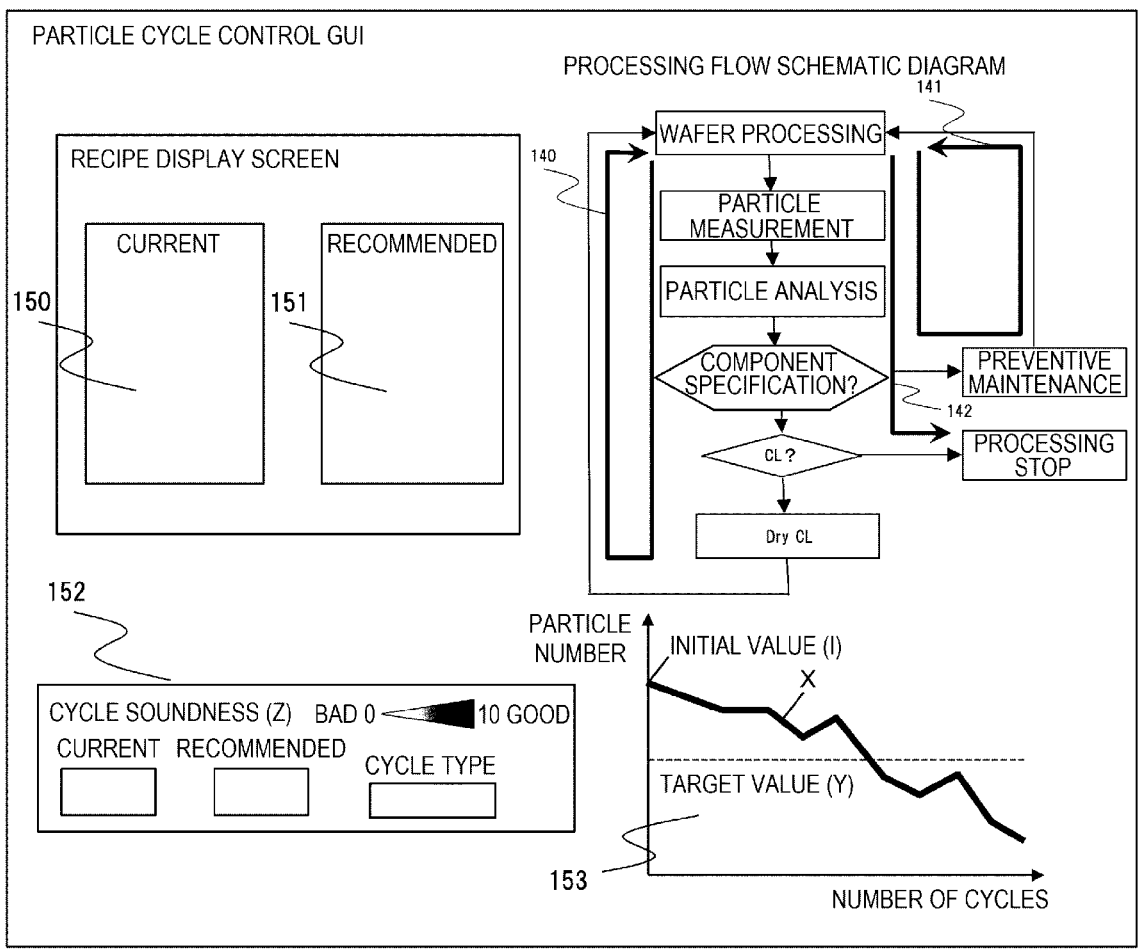

[FIG. 5]
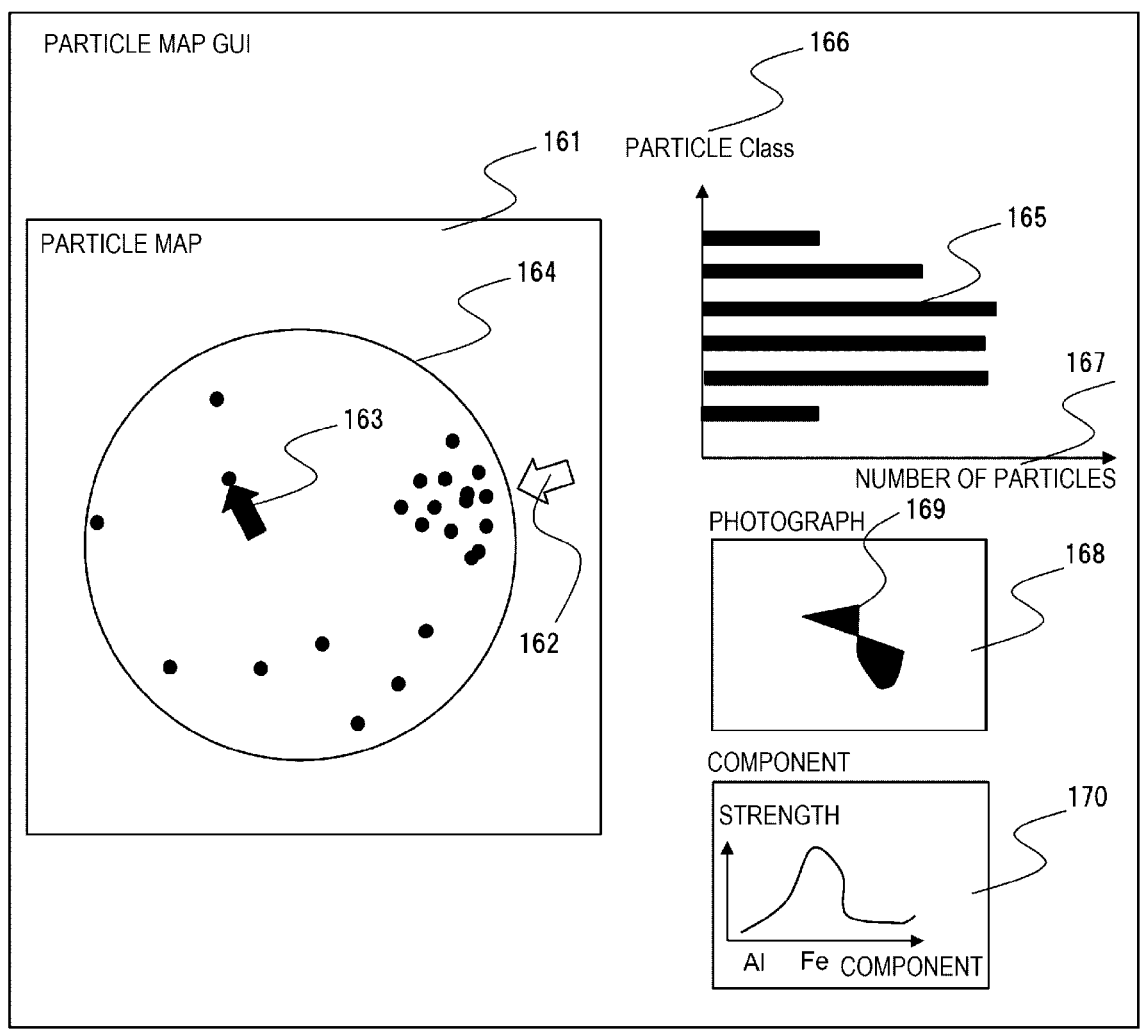

SEMICONDUCTOR DEVICE MANUFACTURING SYSTEM AND SEMICONDUCTOR DEVICE MANUFACTURING METHOD

TECHNICAL FIELD

The present invention relates to a semiconductor device manufacturing system and a semiconductor device manufacturing method.

BACKGROUND ART

In general, a plasma processing apparatus includes a vacuum processing chamber, a gas supply apparatus connected to the vacuum processing chamber, a vacuum exhaust system that maintains a pressure in the vacuum processing chamber at a desired value, an electrode on which a wafer as a material to be processed is mounted, a plasma generating unit that generates plasma in the vacuum processing chamber, or the like. By setting a processing gas supplied from a shower plate or the like into the vacuum processing chamber into a plasma state by the plasma generating unit, a plasma processing, for example, an etching processing is performed on the wafer held by a wafer mounting electrode.

In recent years, with improvement of a degree of integration of a semiconductor device, microfabrication, that is, improvement in processing accuracy has been required. In particular, a chip of the semiconductor device also becomes fine, a width between wirings is small, a particle larger than a wiring width is likely to adhere, and if the adhered particle is conductive, a short circuit occurs and an original function of the semiconductor device cannot be exhibited. Further, no matter whether the particle is insulating or conductive, when the chip to which the particle is attached is transferred to a next step, if the next step is, for example, an etching step, the particle becomes a mask that inhibits the etching, and it is difficult to form a desired etching processed shape.

Therefore, it is necessary to improve a yield of processing so as to reduce the particle as described above and acquire a normal semiconductor device. As an idea to improve the yield, there is a technique for searching plasma processing conditions for particle reduction.

As shown in PTL 1, there is known a technique in which a personal computer for an etcher installed on a production line is connected to a personal computer of an etcher supplier via a network, an etching result obtained from a recipe processed on the personal computer of the etcher supplier is transmitted and stored to the personal computer of the production line, a know-how obtained from a demonstration of the etcher supplier is stored on the personal computer of the etcher supplier, a recipe for improving etching performance by cooperating with each personal computer is derived, and the next recipe is created.

CITATION LIST

Patent Literature

PTL 1: JP-A-2008-34877

SUMMARY OF INVENTION

Technical Problem

It has been found that this technique in the related art exhibits effects of ensuring the etching performance, for example, critical dimension (CD) performance and etching rate uniformity, but it is difficult to reduce the number of particles, and there is a limit to improving the performance of the device. The reason why the performance improvement is limited is that although it is possible to derive a good result based on a guideline for the performance improvement, there is no learning function that is improved by repeatedly performing this improvement cycle.

Further, in the technique of PTL 1, although it contributes to the improvement of the etching performance, there is no mention of units for reducing the number of the particles and a cleaning method, and it is difficult to reduce the particles on the wafer.

The invention is to provide a semiconductor device manufacturing system and a semiconductor device manufacturing method for reducing particles having an adverse effect in a manufacturing step of a semiconductor device.

Solution to Problem

In order to solve the above problems, a typical semiconductor device manufacturing system according to the invention includes: a semiconductor manufacturing apparatus; and a platform connected to the semiconductor manufacturing apparatus via a network and in which a particle reduction processing is executed, in which the particle reduction processing includes: a step of acquiring a particle characteristic value by using a sample processed by the semiconductor manufacturing apparatus; a step of specifying a component of the semiconductor manufacturing apparatus leading to a particle generation based on the acquired particle characteristic value and correlation data by machine learning; a step of defining a cleaning condition for cleaning the semiconductor manufacturing apparatus based on the specified component; and a step of cleaning the semiconductor manufacturing apparatus using the defined cleaning condition, and the correlation data is correlation data between the particle characteristic value acquired in advance and the component.

A typical semiconductor device manufacturing method for manufacturing a semiconductor device using a semiconductor manufacturing apparatus according to the invention, the semiconductor device manufacturing method includes: a step of acquiring a particle characteristic value by using a sample processed by the semiconductor manufacturing apparatus; a step of specifying a component of the semiconductor manufacturing apparatus leading to a particle generation based on the acquired particle characteristic value and correlation data by machine learning; a step of defining a cleaning condition for cleaning the semiconductor manufacturing apparatus based on the specified component; and a step of cleaning the semiconductor manufacturing apparatus using the defined cleaning condition, the correlation data is correlation data between the particle characteristic value acquired in advance and the component.

A typical semiconductor device manufacturing system according to the invention includes: a semiconductor manufacturing apparatus; and a platform connected to the semiconductor manufacturing apparatus via a network and in which a particle reduction processing is executed, in which the particle reduction processing includes: a step of acquiring a particle characteristic value by using a sample processed by the semiconductor manufacturing apparatus; a step of specifying a component of the semiconductor manufacturing apparatus leading to a particle generation based on the acquired particle characteristic value and correlation data; a step of defining a cleaning condition for cleaning the semiconductor manufacturing apparatus based on the specified component; and a step of cleaning the semiconductor manufacturing apparatus using the defined cleaning condition, the correlation data is correlation data between the particle characteristic value acquired in advance and the component, and the particle characteristic value includes a position of a particle on the sample.

Advantageous Effect

According to the invention, it is possible to provide a semiconductor device manufacturing system and a semiconductor device manufacturing method for reducing particles having an adverse effect in a manufacturing step of a semiconductor device.

Objects, configurations and effects other than those described above will be clarified by the description of the following embodiments.

BRIEF DESCRIPTION OF DRAWINGS

FIG. 1 is a block diagram of a semiconductor device manufacturing system according to an embodiment of the invention.

FIG. 2 is a network diagram of the semiconductor device manufacturing system according to the embodiment of the invention.

FIG. 3 is a flowchart showing a particle measurement automatic processing cycle in manufacturing a semiconductor device according to the embodiment of the invention.

FIG. 4 is a diagram showing an operation screen for controlling a particle cycle.

FIG. 5 is a diagram showing a graphical user interface (GUI) of particle measurement results.

DESCRIPTION OF EMBODIMENTS

A semiconductor device manufacturing system according to the present embodiment is equipped with a semiconductor manufacturing apparatus, a particle measurement apparatus, and a network accessible to various databases, and executes a processing flowchart for particle reduction. The "network" refers to an information communication network implemented by, for example, the Internet, a wide area network (WAN), a local area network (LAN), a dedicated line, or a combination thereof.

Further, the semiconductor device manufacturing system according to the present embodiment includes the semiconductor manufacturing apparatus and a platform connected to the semiconductor manufacturing apparatus via a network to execute a particle reduction processing. Here, the platform includes, for example, a server that is connected to the network and includes an application for the particle reduction processing. The semiconductor manufacturing apparatus and the platform are preferably configured as cloud computing and are preferably connected to the semiconductor manufacturing apparatus via the local area network.

First Embodiment

Hereinafter, an embodiment of the invention will be described with reference to FIG. 1. First, a processing flow in a semiconductor device manufacturing system of FIG. 1 will be described. A purpose of the processing flow shown in this figure is particle reduction which is important in semiconductor manufacturing.

In the semiconductor manufacturing apparatus, it is necessary to set various process conditions. In the present embodiment, an example of an optimization automatic sequence of a process condition for particle reduction is shown. For example, here, an example in which a search cycle for searching for an optimum cleaning condition with which the particle reduction is possible which can be applied to an etching apparatus which is the semiconductor manufacturing apparatus and is automated will be described. In the following example, a recipe database 110 and a storage database 109 are constructed on an external server on a cloud 111 and accessible via the Internet, and the recipe database 110 and the storage database 109 may be constructed on a local server.

The particle reduction processing executed based on the application provided in the platform includes a step of acquiring a particle characteristic value by using a sample processed by the semiconductor manufacturing apparatus (here, a plasma etching apparatus), a step of specifying a component of the semiconductor manufacturing apparatus leading to a particle generation based on the acquired particle characteristic value and correlation data, a step of defining a cleaning condition for cleaning the semiconductor manufacturing apparatus based on the specified component, and a step of cleaning the semiconductor manufacturing apparatus using the defined cleaning condition. The correlation data is the correlation data between the particle characteristic value acquired in advance and the component. Hereinafter, the particle reduction processing will be described in detail.

In FIG. 1, a wafer to be processed which is to be processed by a semiconductor manufacturing apparatus processing execution unit 101, that is, the etching apparatus, is etching-processed based on a predetermined processing recipe. The processing recipe is a collection of a plurality of parameter values such as control parameters for controlling each unit of the etching apparatus and setting parameters, and includes, for example, the parameter values such as a type of a processing gas, a flow rate ratio of an additive gas, a pressure in a processing chamber, an upper radio frequency power, a lower radio frequency power, an upper electrode temperature, and a lower electrode temperature.

The processing recipe is stored in the recipe database 110, and a code number as a recipe identifier is given for determination. The code number is information related to the processing recipe and is a number associated with the processing wafer etching-processed based on the processing recipe, and, for example, a barcode may be attached to a cassette that stores the wafer and given in a read form. In addition, the bar code may include an apparatus identifier (including information related to a processing apparatus, for example, information related to a material of each component of the processing apparatus) that specifies the etching apparatus used for the processing, and a wafer identifier (including information on the material of the wafer) that specifies a processed wafer.

Here, a system to be automatically assigned when the processing recipe is stored in the recipe database 110 is assumed. At this time, a unique number is acquired mechanically, and at the same time, for example, a processing executor assigns an identifiable number based on the apparatus identifier, the wafer identifier, and the recipe identifier (code number). As a result, a mechanical processing such as associating the processing recipe with the data is performed with the unique number that is required to be distinguished from other numbers, and the processing executor uses the number to store the data, specifies a storage location, and uses the identifiable number to determine whether the processing recipe is correct. The unique number and the identifiable number can be associated with each other in the system, that is, there is a one-to-one correspondence.

Thereafter, the processed wafer is automatically transferred or manually transferred to a particle measurement machine, a particle characteristic value acquisition unit 102 measures the number, composition, distribution (including position coordinates of the particle with respect to the wafer), shape, and dimensions of particles on the wafer, and acquires various measurement results. The measurement results are stored in the recipe database 110. This particle measurement machine is often a combination of a plurality of apparatuses. For example, after the measurement is performed by the apparatus (particle measurement apparatus) that measures the number and the distribution of the particles, component analysis, shape and dimension measurement of the particle according to a particle location thereof may be performed by another measurement apparatus (particle analysis apparatus). Various measurements may be performed by a single measurement apparatus.

In a state in which the measurement results acquired here are associated with the processing recipe, the measurement results are stored in the recipe database 110 on the cloud (external server or the like) 111. In such a case, there are two types of methods including a method of storing the processing recipe and the measurement results in association with each other in a unified folder created in advance by the identifiable number, which is determined by the processing executor, and a method of automatically associating the processing recipe and the measurement results by the system with the unique number. As a result, the processing recipe and the measurement results are associated with each other on the one-to-one correspondence, and superiority or inferiority of the processing recipe based on the results can be determined.

As an example, when the number A, a component B, a distribution C, a shape D, and a dimension E of the particle are ranked as the particle characteristic values in five stages from a little to a large value, and weights W1, W2, W3, W4, and W5 are used, an evaluation value V of the particles is given by the following formula.

$$V = W1 \cdot A + W2 \cdot B + W3 \cdot C + W4 \cdot D + W5 \cdot E \quad (1)$$

A calculation of Formula (1) can be performed by a center personal computer 123 (or an external personal computer 133), and it can be determined that the processing recipe is excellent as the evaluation value V is lower. The evaluation value V is stored as information related to the particle characteristic value in the recipe database 110 in association with the processing recipe.

Thereafter, in order to search for a cause of a particle source from the acquired measurement results, the processing proceeds to analysis work of a particle analysis examination unit 103. An analysis result (specific component) is associated with the particle and a characteristic value, and is stored as the correlation data in the storage database 109. For example, in a component specification examination unit 104, when an element having a relatively large amount among the elements contained in a particle component is a main component of a material of the component used in the apparatus, the component is specified as the particle source based on the recorded apparatus identifier. Alternatively, when a first main component, which is an element having the largest amount among the elements contained in the particle component, is a component in a certain gas type, and a next second main component is a surface treatment component of a certain component, a substance formed by a chemical reaction between the gas and the component is specified as the particle source based on the recorded processing recipe.

The particle source is specified by a specific program stored in the storage database 109. Input information to the storage database 109 at this time includes, for example, particle component information or shape information (the above evaluation value V) which is a particle measurement result, bar code information of the cassette that stores the wafer, or the like. Output information from the storage database 109 is specified component information or environmental information. In this processing flow, the specification of the particle source is automated, and the number of flow cycles is further increased and stored in the storage database 109, and therefore the storage database 109 evolves, and eventually an entire system evolves. That is, the particle reduction processing of the semiconductor device manufacturing system according to the present embodiment is executed using machine learning, and it is possible to make the system intelligence by repeating the flow cycle. A prediction model used for the machine learning is updated every time the particle reduction processing is repeated.

Thereafter, a method of removing the specified particle source is examined. For example, when the evaluation value V exceeding a threshold value or the like, and it is determined that the particle cannot be removed by cleaning in the semiconductor manufacturing apparatus by a semiconductor manufacturing apparatus cleaning execution unit 106, the processing proceeds to chamber cleaning or the like by a preventive maintenance operator 107 as preventive maintenance.

On the other hand, for example, when the evaluation value V is equal to or less than the threshold value and it is determined that the particle can be removed by the cleaning in the semiconductor manufacturing apparatus, a cleaning condition examination unit 105 examines the cleaning conditions including the number of times or a frequency of cleaning, such as whether a single cleaning recipe is repeated a plurality of times or the single cleaning recipe is periodically performed, or whether the cleaning of in-situ is performed for each processing.

An experience value for examining the cleaning conditions is stored in the storage database 109 in advance, and the experience value is further stored by repeating this cycle as needed while associating a cleaning result with the evaluation value V of the particle. Here, the experience value is actual data in which the evaluation value V decreases by X % when the cleaning is performed under a certain cleaning condition. Here, when there is no prospect of improvement in cleaning, or when it is determined that the processing needs to be stopped manually, a processing stop determiner 108 selects processing stop.

Thereafter, after a cleaning processing of the semiconductor manufacturing apparatus cleaning execution unit 106, the processing of the semiconductor manufacturing apparatus processing execution unit 101 is performed again, and the above cycle is repeated. As a result, the particle is measured, the particle is analyzed, the particle is evaluated, and new data can be acquired. An improvement effect of one cycle can be stored in the storage database 109 on the cloud 111 and used as an index for determining a capacity of this system.

A loop is closed from the processing of the semiconductor manufacturing apparatus processing execution unit 101 to the processing of the semiconductor manufacturing apparatus cleaning execution unit 106, and can be performed mechanically without an intervention of the processing executor. Therefore, it is possible to automatically execute the cycle, and it is possible to automate a particle processing reduction sequence. Therefore, as long as the processing is not shifted to the processing stop (performed by the processing stop determiner 108) or the preventive maintenance (performed by the preventive maintenance executor 107) of a small frequency, the particle processing reduction sequence is mechanically repeated, and an evolution of the sequence can also be autonomously performed.

Second Embodiment

Another embodiment of the invention will be described with reference to FIGS. 2 and 3. First, an embodiment using a network diagram of the device of FIG. 2 will be described. FIG. 2 shows a connection method between the semiconductor manufacturing apparatus and a particle inspection apparatus, a flow of data to be processed, and a network construction method for protecting important data security.

In the present embodiment, it is assumed that a semiconductor manufacturing apparatus 127 includes a built-in cleaning apparatus (function). The semiconductor manufacturing apparatus 127 is normally disposed in a clean room, and is connected to a local network 132 in the clean room. A particle inspection apparatus 128 and a particle analysis apparatus 129, which are also disposed in the clean room, are connected to the local network 132, and an electron microscope 130 for inspection and observation after the semiconductor manufacturing is connected to the local network 132.

The local network 132 is not necessarily secure in terms of security, and the latest security patch is not always applied to an operating system (OS) or the like of each device. Therefore, each device can be accessed and the security patch and data can be temporarily stored, further, the data can be checked for viruses via a secured local program server 120, and the data can be uploaded to a network 131 outside the clean room after controlling a transmitting source and a reception source of the data and securing a safe data passage through a firewall 126.

From the local program server 120, for example, the data may be transmitted to a center personal computer 123 for examining a recipe or the like for the semiconductor manufacturing apparatus, the data can be transmitted to an external Internet 125 via a firewall 124 after controlling the transmitting source and the reception source of the data and securing the safe data passage, and an environment accessible from the personal computer 133 around the world via the Internet 125 can also be constructed.

As a result, a recipe for the semiconductor manufacturing can be transferred from each personal computer 133 to the local program server 120, or measurement data can be acquired by each personal computer 133 via the local program server 120. Therefore, since various works can be performed even if the processing executor goes to the clean room and does not access the personal computer of each device, work efficiency can be improved. In addition, since the data of each device can be acquired substantially in real time by each personal computer 133, it is also possible to automatically generate an optimal recipe in real time by using an external AI engine or the like, and transmit the optimal recipe to the device in the clean room. In the present embodiment, it is assumed that the recipe database 110 and the storage database 109 are built on the external server on the cloud 111.

A system that automatically executes a series of manufacturing cycles regardless of whether the AI engine or the like is used will be described with reference to FIG. 3. First, a normal manufacturing cycle route (sequence) 140 will be described. The manufacturing cycle shown in FIG. 3 is executed under control of the local program server 120 which is a control device.

First, in step S201, a wafer processing, for example, an etching processing of the wafer is performed by the semiconductor manufacturing apparatus 127, and then the wafer is automatically transferred to the particle inspection apparatus 128. In step S202, a particle measurement (inspection) is performed, and then the wafer is automatically transferred to the particle analysis apparatus 129, and particle analysis is performed in step S203. Data of the particle measurement is inquired to the storage database 109 shown in FIG. 1, and the analysis is performed.

If the component or the like to be the extracted particle source is specified in step S204, the cleaning condition is further examined by inquiring to the storage database 109 in step S205. If the cleaning condition is specified, dry cleaning is performed in step S206, an environment in a chamber is adjusted, and the manufacturing cycle is advanced to the wafer processing in step S201 again.

This normal manufacturing cycle route 140 is autonomously performed by the local program server 120 and is a closed loop that can be automated as shown in FIG. 3, but there may be other cases where the normal manufacturing cycle route 140 is deviated from the closed loop. Such a case will be described.

For example, as a result of the particle analysis, if it is determined in step S205 that a chamber environment cannot be adjusted in the cleaning, the processing proceeds to the processing stop of step S207 along a processing stop route 142. Further, when it is determined that there is no improvement even if the processing proceeds to the dry cleaning at the time of specifying the component that generates the particle (S204), along a preventive maintenance return loop 141, a wet cleaning or the like is executed in step S208, and the preventive maintenance of the chamber cleaning is performed. In either case, the local program server 120 can make a mechanical determination.

Even in this case, if the chamber cleaning can be automated by a cleaning robot, the cleaning can be automated according to an instruction of the local program server 120, and even if the chamber cleaning is manual work, and is semi-automatic, a cycle loop can be executed. The improvement effect of the series of manufacturing cycles shown in FIG. 3 is stored in the sequential storage database 109, which serves as a material for determining the superiority or the inferiority of the cycle itself.

In FIG. 2, a semiconductor manufacturing apparatus monitoring server 122 dedicated to the semiconductor manufacturing apparatus 127 and a particle inspection apparatus monitoring server 121 dedicated to the particle inspection apparatus 128 are connected to the network 131 outside the clean room. These monitoring servers are always connected to the Internet 125 outside the clean room in order to keep the security in the latest state. Therefore, the data can be collected by accessing the semiconductor manufacturing apparatus 127 and the particle inspection apparatus 128 from the external personal computer 133 via the firewall 126 starting from these monitoring servers. For example, it is possible to secure processing reservation for each device in the clean room from the external personal computer 133, transfer a recipe for measurement or manufacturing to each device, and acquire the data of each device.

Third Embodiment

Further, another embodiment of the invention will be described with reference to FIG. 4.

FIG. 4 is an operation screen for controlling a particle cycle, and is displayed on a monitor of the center personal computer 123, for example. Here, as an example, together with a flow of a particle measurement automatic processing cycle in FIG. 3, a current processing recipe 150 and a recommended processing recipe 151 that is subjected to arithmetic processing by each server in FIG. 1 and is searched so as to decrease the particle are shown in comparison with each other in a recipe display screen for the wafer processing. The processing executor or a person who gives the instruction to the processing executor (hereinafter referred to as the processing executor or the like) examines whether to reflect the content in the current processing recipe 150 while looking at the displayed recommended processing recipe 151.

The processing executor or the like can refer to a cycle soundness display frame 152 displayed side by side as a determination criterion for reflecting the processing recipe 150. If the processing executor or the like can determine that a device environment is improved by looking at the cycle soundness display frame 152, it becomes easy to select the recommended processing recipe 151 as the processing recipe 150. Further, as shown in FIG. 4, by displaying a particle number transition graph 153 side by side, the processing executor or the like can clearly grasp a relationship between a transition so far and a target value.

Here, the normal manufacturing cycle route 140 and a return loop 141 in FIG. 4 are closed cycles, and are portions that can be automated. In the return loop 141, there is a possibility that a determination of the processing executor or the like is involved only in a preventive maintenance unit, but the return loop may be performed by an automation robot.

A portion of a difference between the recommended processing recipe 151 and the current processing recipe 150, specifically, a parameter in the recipe, becomes a primary control variable when soundness of the cycle itself is set as an objective variable. Since it is also possible to randomly change the primary control variable in each server in FIG. 1 and estimate the objective variable, it is also possible to automatically control the objective variable so as to indicate a better cycle soundness.

Here, a cycle soundness Z can be expressed by the following formula by using a symbol X (the number of current particles), a symbol I (the number of initial particles), and a symbol Y (the number of target particles) in FIG. 4 as an example.

$$Z = 10 \times (X-I)/(Y-I) \quad (2)$$

X in Formula (1) is a secondary control variable that changes depending on the primary control variable, and Formula (2) shows that the objective variable Y changes with the secondary control variable X. Each of the control variable and the objective variable has a numerical range, and is updated every time the control variable accumulates the number of controls. The above is just an example, and any function that associates each parameter can be used. Further, since a relationship between the primary control variable and the secondary control variable is difficult to express by a formula since a physical phenomenon is quite complicated, it is often substituted by using AI or a machine learning function.

FIG. 5 shows a graphical user interface (GUI) of the particle measurement result. In a particle map display frame 161, as a map diagram showing a position of the particle, the measured particle is indicated by a point in a wafer frame 164 showing an outer shape of the wafer. The particle is associated with a photograph of the particle for each coordinate value, and the photograph (image) of the particle pointed by a mouse pointer 163 is shown in a particle photograph frame 168 due to a mouse hover. As a result, a particle shape 169 can be visually confirmed. At the same time, a strength of an element component contained in the particle is shown in a particle component chart 170.

In an example of FIG. 5, the particles are concentrated in a gas blowing direction indicated by a white arrow 162, and it is possible to visually analyze that the particles are accumulated on the wafer by gas blowing. In addition, it can be seen that a strength of a Fe portion is large by visually checking the particle component chart 170. When a material of a gas pipe for the gas blowing is a stainless steel material, a large amount of Fe component may be accumulated in particular, so that it can be inferred that the particle from the gas pipe made of the stainless steel material adheres to the wafer.

Further, a size of the particle for each coordinate is calculated, and the number of the particles for each size of the particle is displayed on a bar chart 165. Here, as an example, a vertical axis 166 indicates a particle class, and a horizontal axis 167 indicates the number of the particles. Accordingly, it is possible to quantitatively analyze the distribution of the particle for each particle class.

In the present embodiment, a material to be etched is a silicon oxide film, as etching gas and cleaning gas, for example, the above tetrafluoride methane gas, oxygen gas, and trifluoromethane gas are used, as the material to be etched, not only the silicon oxide film is used, the same effect can be obtained even in a polysilicon film, a photoresist film, an antireflection organic film, an antireflection inorganic film, an organic material, an inorganic material, a silicon oxide film, a silicon nitride oxide film, a silicon nitride film, a Low-k material, a High-k material, an amorphous carbon film, a Si substrate, a metal material, or the like.

As a gas to be etched, for example, chlorine gas, hydrogen bromide gas, methane tetrafluoride gas, methane trifluoride, methane difluoride, argon gas, helium gas, oxygen gas, nitrogen gas, carbon dioxide, carbon monoxide, hydrogen, ammonia, propane octafluoride, nitrogen trifluoride, sulfur hexafluoride gas, methane gas, silicon tetrafluoride gas, silicon tetrachloride gas, chlorine gas, hydrogen bromide gas, methane tetrafluoride gas, methane trifluoride, methane difluoride, argon gas, helium gas, oxygen gas, nitrogen gas, carbon dioxide, carbon monoxide, hydrogen, ammonia, propane octafluoride, nitrogen trifluoride, sulfur hexafluoride gas, methane gas, silicon tetrafluoride gas, silicon tetrachloride gas helium gas, neon gas, krypton gas, xenon gas, radon gas, or the like can be used.

As the etching apparatus, an etching apparatus using a microwave ECR discharge can be preferably used, and a dry etching apparatus using another discharge (magnetic field UHF discharge, capacitive coupling type discharge, induction coupling type discharge, magnetron discharge, surface wave excitation discharge, transfer coupled discharge) can also be similarly used. Further, in each of the above embodiments, the etching apparatus has been described, but other plasma processing apparatuses that perform the plasma processing, for example, a plasma CVD apparatus, an asking apparatus, a surface modification apparatus, or the like can be similarly used.

The embodiment described above has been described in detail for easy understanding of the invention, and the invention is not necessarily limited to include all the configurations described above. In addition, a part of the configuration of one embodiment can be replaced with the configuration of another embodiment, and the configuration of another embodiment can be added to the configuration of one embodiment. In addition, a part of the configuration of each embodiment can be added, deleted, or replaced with another configuration.

REFERENCE SIGN LIST 101 semiconductor manufacturing apparatus processing execution unit
102 particle characteristic value acquisition unit
103 particle analysis examination unit
104 component specification examination unit
105 cleaning condition examination unit
106 semiconductor manufacturing apparatus cleaning execution unit
107 preventive maintenance operator
108 processing stop determiner
109 storage database
110 recipe database
111 cloud
120 local program server
121 particle inspection apparatus monitoring server
122 semiconductor manufacturing apparatus monitoring server
123 center personal computer
124 firewall
125 Internet
126 firewall
127 semiconductor manufacturing apparatus
128 particle inspection apparatus
129 particle analysis apparatus
130 electron microscope
131 network outside clean room
132 local network in clean room
133 personal computer
140 normal cycle route
141 preventive maintenance return loop
142 processing stop route
150 current processing recipe
151 recommended processing recipe
152 cycle soundness display frame
161 particle map display frame
162 gas blowing direction
163 mouse pointer
164 wafer frame
165 bar chart
166 vertical axis
167 horizontal axis
168 particle photograph frame
169 particle shape
170 particle component chart

The invention claimed is:

1. A semiconductor device manufacturing system, comprising:
   a semiconductor manufacturing apparatus; and
   a platform connected to the semiconductor manufacturing apparatus via a network and configured to perform particle reduction processing including
   acquiring a plurality of particle characteristic values for each of a plurality of particles of a sample processed by the semiconductor manufacturing apparatus;
   using stored correlation data, specifying a component of the semiconductor manufacturing apparatus that is correlated with a particle generation based on a ranking of the plurality of particles according to a calculated evaluation value for each of the plurality of particles and the stored correlation data which is stored in a database, wherein each of the calculated evaluation values is determined based on the plurality of acquired particle characteristic values associated with each of the plurality of particles, and a weight assigned to each particle characteristic value, wherein the plurality of acquired particle characteristic values comprises a number of the particle, a composition of the particle, a distribution of the particle with respect to a location on the sample, a shape of the particle, and dimensions of the particle;
   defining a cleaning condition for cleaning the semiconductor manufacturing apparatus based on the specified component and a stored experience value; and
   cleaning the semiconductor manufacturing apparatus using the defined cleaning condition,
   wherein the correlation data stored in the database is correlation data between the specified component and a particle characteristic value that was determined for a previous iteration of the particle reduction processing.

2. The semiconductor device manufacturing system according to claim 1, wherein
   the particle reduction processing is executed as an application provided on the platform.

3. The semiconductor device manufacturing system according to claim 1, wherein
   the semiconductor manufacturing apparatus and the platform are configured as cloud computing.

4. The semiconductor device manufacturing system according to claim 1, wherein
   the platform is connected to the semiconductor manufacturing apparatus via a local area network.

5. The semiconductor device manufacturing system according to claim 1, wherein
   a particle measurement apparatus and a particle analysis apparatus are connected to the platform via the network,
   the particle characteristic value includes the number of particles and a component of a particle,
   the number of particles is measured by the particle measurement apparatus, and
   the component of the particle is analyzed by the particle analysis apparatus.

6. The semiconductor device manufacturing system according to claim 5, wherein
   the platform includes a server, and
   the semiconductor manufacturing apparatus is a plasma etching apparatus.

7. The semiconductor device manufacturing system according to claim 1, wherein
   a prediction model used for the machine learning is updated every time the particle reduction processing is repeated.

8. A semiconductor device manufacturing method for manufacturing a semiconductor device using a semiconductor manufacturing apparatus, the semiconductor device manufacturing method comprising:

a step of acquiring a plurality of particle characteristic values for each of a plurality of particles of a sample processed by the semiconductor manufacturing apparatus;

a step of using stored correlation data for specifying a component of the semiconductor manufacturing apparatus that is correlated with a particle generation based on a ranking of the plurality of particles according to a calculated evaluation value for each of the plurality of particles and the stored correlation data which is stored in a database, wherein each of the calculated evaluation values is determined based on the plurality of acquired particle characteristic values associated with each of the plurality of particles, and a weight assigned to each particle characteristic value, wherein the plurality of acquired particle characteristic values comprises a number of the particle, a composition of the particle, a distribution of the particle with respect to a location on the sample, a shape of the particle, and dimensions of the particle;

a step of defining a cleaning condition for cleaning the semiconductor manufacturing apparatus based on the specified component and a stored experience value; and a step of cleaning the semiconductor manufacturing apparatus using the defined cleaning condition, wherein the correlation data stored in the database is correlation data between the specified component and a particle characteristic value that was determined for a previous iteration of the particle reduction processing.

9. The semiconductor device manufacturing method according to claim 8, wherein the semiconductor manufacturing apparatus is a plasma etching apparatus, and the semiconductor device manufacturing method further includes a step of wet cleaning the plasma etching apparatus when it is determined that a particle is not reduced by plasma cleaning after specifying the component of the semiconductor manufacturing apparatus that is correlated with the particle generation.

10. A semiconductor device manufacturing system, comprising:

a semiconductor manufacturing apparatus; and a platform connected to the semiconductor manufacturing apparatus via a network and which is configured to perform particle reduction processing including acquiring a plurality of particle characteristic values for each of a plurality of particles of a sample processed by the semiconductor manufacturing apparatus;

specifying a component of the semiconductor manufacturing apparatus that is correlated with a particle generation based on a ranking of the plurality of particles according to a calculated evaluation value for each of the plurality of particles and the stored correlation data which is stored in a database, wherein each of the calculated evaluation values is determined based on the plurality of acquired particle characteristic values associated with each of the plurality of particles, and a weight assigned to each particle characteristic value, wherein the plurality of acquired particle characteristic values comprises a number of the particle, a composition of the particle, a distribution of the particle with respect to a location on the sample, a shape of the particle, and dimensions of the particle;

defining a cleaning condition for cleaning the semiconductor manufacturing apparatus based on the specified component and a stored experience value; and cleaning the semiconductor manufacturing apparatus using the defined cleaning condition, wherein the correlation data stored in the database is correlation data between the specified component and a particle characteristic value that was determined for a previous iteration of the particle reduction processing.

11. The semiconductor device manufacturing system according to claim 10, further comprising:

a graphical user interface in which a map diagram showing a position of a particle on the sample is displayed.

12. The semiconductor device manufacturing system according to claim 11, wherein an image of a shape of the particle is displayed by the graphical user interface.

13. The semiconductor device manufacturing system according to claim 11, wherein a particle component chart showing a strength of an element component contained in the particle is displayed by the graphical user interface.

14. The semiconductor device manufacturing system according to claim 12, wherein a particle component chart showing a strength of an element component contained in the particle is displayed by the graphical user interface.

* * * * *